US009872079B2

(12) United States Patent
McNamee et al.

(10) Patent No.: US 9,872,079 B2
(45) Date of Patent: Jan. 16, 2018

(54) SYSTEMS AND METHODS FOR DISTRIBUTING AUDIO/VIDEO FEED OF A LIVE EVENT VIA SATELLITE

(71) Applicants: Roger B. McNamee, Manlo Park, CA (US); Glenn Evans, Menlo Park, CA (US); Mark Richards Frederick, Sandy, UT (US)

(72) Inventors: Roger B. McNamee, Manlo Park, CA (US); Glenn Evans, Menlo Park, CA (US); Mark Richards Frederick, Sandy, UT (US)

(73) Assignee: THE ROGER B. AND ANN K. MCNAMEE TRUST U/T/A/D, Woodside, CA (US)

( * ) Notice: Subject to any disclaimer, the term of this patent is extended or adjusted under 35 U.S.C. 154(b) by 0 days.

(21) Appl. No.: 13/840,913

(22) Filed: Mar. 15, 2013

(65) Prior Publication Data
US 2014/0282748 A1 Sep. 18, 2014

(51) Int. Cl.
H04N 5/222 (2006.01)
H04N 21/61 (2011.01)
(Continued)

(52) U.S. Cl.
CPC ......... H04N 21/6193 (2013.01); H04N 5/222 (2013.01); H04N 21/2187 (2013.01);
(Continued)

(58) Field of Classification Search
CPC ........... H04N 21/2187; H04N 21/2343; H04N 21/2665; H04N 21/6143; H04N 21/21;
(Continued)

(56) References Cited

U.S. PATENT DOCUMENTS

2002/0046405 A1* 4/2002 Lahr ................. H04L 29/06027
725/87
2002/0104920 A1* 8/2002 Thompson ................ G06F 8/65
244/3.14
(Continued)

OTHER PUBLICATIONS

International Search Report and Written Opinion for PCT/US2014/022841, filed Mar. 10, 2014, dated Jun. 26, 2014.
(Continued)

Primary Examiner — Benjamin R Bruckart
Assistant Examiner — Jen-Shi Huang
(74) Attorney, Agent, or Firm — Morgan, Lewis & Bockius LLP

(57) ABSTRACT

In some implementations, a method for distributing content feed of a live event via satellite includes: obtaining media signals for the live event from signal sources, where the media signals comprise audio and visual feed of the live event; converting the media signals into a mixed digital media signal; wirelessly transmitting, using a network protocol, the mixed digital media signal to a satellite uplink device; wirelessly transmitting, using the satellite uplink device, the mixed digital media signal to a satellite; identifying content delivery networks in electronic communication with client devices configured to receive the mixed digital media signal; obtaining the mixed digital media signal from the satellite, using a satellite downlink device; and delivering the mixed digital media signal to the one or more identified content delivery networks, through the satellite downlink device, where the identified content delivery networks further deliver the mixed digital media signal to the client devices.

23 Claims, 11 Drawing Sheets

(51) Int. Cl.
*H04N 21/2187* (2011.01)
*H04N 21/258* (2011.01)
*H04N 21/414* (2011.01)
*H04N 21/4223* (2011.01)
*H04N 21/462* (2011.01)

(52) U.S. Cl.
CPC . *H04N 21/25841* (2013.01); *H04N 21/41407* (2013.01); *H04N 21/4223* (2013.01); *H04N 21/4622* (2013.01); *H04N 21/6125* (2013.01); *H04N 21/6143* (2013.01)

(58) Field of Classification Search
CPC ......... H04N 21/2383; H04N 21/25866; H04N 21/4622; H04N 21/6193; H04N 7/17336; H04N 21/25841; H04N 21/41407; H04N 21/4223; H04N 21/6125; H04N 5/222
USPC .......................................................... 725/63
See application file for complete search history.

(56) References Cited

U.S. PATENT DOCUMENTS

| | | | |
|---|---|---|---|
| 2003/0035386 A1* | 2/2003 | Sullivan | H04B 7/18584 370/316 |
| 2003/0204850 A1* | 10/2003 | Ng et al. | 725/63 |
| 2005/0037706 A1* | 2/2005 | Settle | H04B 7/18586 455/12.1 |
| 2005/0136832 A1* | 6/2005 | Spreizer | H04B 7/18567 455/3.02 |
| 2005/0246751 A1* | 11/2005 | Boyce | H04N 21/23439 725/101 |
| 2005/0260948 A1* | 11/2005 | Regulinski | H04B 7/18513 455/12.1 |
| 2006/0277576 A1 | 12/2006 | Acharya et al. | |
| 2007/0044133 A1* | 2/2007 | Hodecker | 725/117 |
| 2007/0204300 A1 | 8/2007 | Markley et al. | |
| 2008/0307948 A1 | 12/2008 | Minarik | |
| 2009/0089065 A1* | 4/2009 | Buck | B60R 16/0373 704/275 |
| 2009/0189981 A1* | 7/2009 | Siann et al. | 348/143 |
| 2009/0238263 A1* | 9/2009 | Jaggi et al. | 375/240.2 |
| 2010/0271951 A1 | 10/2010 | Dujardin et al. | |
| 2012/0320196 A1 | 12/2012 | Overton et al. | |
| 2013/0194495 A1* | 8/2013 | Pan | 348/515 |
| 2014/0038515 A1* | 2/2014 | Avellan et al. | 455/12.1 |
| 2014/0137162 A1* | 5/2014 | McNamee et al. | 725/63 |
| 2014/0139386 A1* | 5/2014 | Liu et al. | 343/781 CA |
| 2014/0282748 A1 | 9/2014 | McNamee et al. | |
| 2014/0320662 A1* | 10/2014 | McNamee et al. | 348/159 |
| 2014/0325569 A1* | 10/2014 | Suzuki et al. | 725/67 |

OTHER PUBLICATIONS

International Search Report and Written Opinion for PCT/US2013/069721, filed Nov. 12, 2013, dated May 12, 2014.

* cited by examiner

SYSTEMS AND METHODS FOR DISTRIBUTING AUDIO/VIDEO FEED OF A LIVE EVENT VIA SATELLITE

TECHNICAL FIELD

The disclosed implementations relate generally to distributing audio/video feed of a live event via a satellite.

BACKGROUND

Broadcasting events alive has become increasingly important. For example, a baseball fan may prefer watching a baseball game live on a cable network, rather than viewing a rerun several hours (or sometimes, even days) after the game has finished and its score published. Difficulties abound, however, because a cable network or the Internet is not available at all events. For example, a high performance Internet connection may not be available at a rock concert held in a remote mountainous area. Similarly, a high speed cable network connection may not be available at a July 4th parade in a sparsely-populated rural county. As a result, viewers lose enjoyment or excitement associated with experiencing these events as they are happening, and content providers lose viewership and ratings.

The above identified difficulties are reduced or eliminated by the systems and methods disclosed herein.

SUMMARY

In one aspect of the present disclosure, a method for distributing an audio or visual feed of a live event includes obtaining a plurality of media signals for the live event from one or more signal sources. The plurality of media signals comprises an audio or visual feed of the live event. The plurality of media signals are converted into a mixed digital media signal. The mixed digital media signal is transmitted using a network protocol (e.g., an HTTP protocol) to a satellite uplink device. The satellite uplink device is used to transmit the mixed digital media signal to a satellite. Further in the method, one or more content delivery networks are identified that are in electronic communication with a plurality of client devices that are, in turn, configured to receive the mixed digital media signal. The mixed digital media signal is obtained from the satellite, using a satellite downlink device, and delivered to the one or more identified content delivery networks, through the satellite downlink device. The one or more identified content delivery networks further deliver the mixed digital media signal to the plurality of client devices.

In some implementations, the mixed digital media signal is transmitted to the satellite uplink device using a radio frequency connection.

In some implementations, a client device in the plurality of client devices is a tablet computer, a smart phone, a desktop computer, a laptop commuter, a TV, or a portable media player.

In some implementations, a first client device in the plurality of client devices is associated with a different display resolution than a second client device in the plurality of client devices.

In some implementations, a signal source in the one or more signal sources is a video camera or a microphone.

In some implementations, the satellite uplink device is a mobile VSAT (also called very small aperture terminal), and the satellite downlink device is a teleport.

In some implementations, the method further comprises transcoding the mixed digital media signal before delivering the mixed digital media signal to the identified content delivery networks.

In some implementations, the satellite is a high throughput geostationary satellite.

In some implementations, transmitting the mixed digital media signal to the satellite uplink device comprises streaming the mixed digital media signal using a high definition video streamer. In some implementations, the method also includes wirelessly controlling the high definition video streamer using a tablet computer by a user directing the distribution of the audio or visual feed.

In some implementations, converting the plurality of media signals into the mixed digital media signal comprises converting the plurality of media signals into the mixed digital media signal using an audio/video switching or mixing device and transmitting the mixed digital media signals to the high definition video streamer through a high definition serial digital interface (e.g., a HD-SDI).

In some implementations, the plurality of media signals is transmitted to the audio/video switching or mixing device using one or more HDMI connections.

In some implementations, a system for distributing an audio or visual feed of a live event includes providing an audio processing device for processing one or more signal sources. The audio processing device comprises one or more processors and a memory, a satellite uplink device that receives input from the audio processing device, a satellite in electronic communication with the satellite uplink device, and a satellite downlink device in electronic communication with the satellite. The memory comprises one or more programs that are configured to be executed by the one or more processors. The one or more programs include instructions for: (i) obtaining a plurality of media signals for the live event from the one or more signal sources, where the plurality of media signals comprises an audio or visual feed of the live event; (ii) converting the plurality of media signals into a mixed digital media signal; (iii) transmitting, using a network protocol (e.g., an HTTP protocol), the mixed digital media signal to the satellite uplink device; and (iv) identifying one or more content delivery networks in electronic communication with a plurality of client devices that are configured to receive the mixed digital media signal; and where the satellite uplink device is configured for uploading the mixed digital media signal to the satellite. The satellite downlink device is configured for obtaining the mixed digital media signal from the satellite and delivering it to the one or more identified content delivery networks. The one or more identified content delivery networks further deliver the mixed digital media signal to the plurality of client devices.

In some implementations, the mixed digital media signal is transmitted by the satellite uplink device to the satellite using a radio frequency connection.

In some implementations, a client device in the plurality of client devices is a tablet computer, a smart phone, a desktop computer, a laptop commuter, a TV, or a portable media player.

In some implementations, a first client device in the plurality of client devices is associated with a different display resolution than a second client device in the plurality of client devices.

In some implementations, a signal source in the one or more signal sources is a video camera or a microphone.

In some implementations, the satellite uplink device is a mobile VSAT and the satellite downlink device is a teleport.

In some implementations, the satellite downlink device is further configured to transcode the mixed digital media signal before delivering the mixed digital media signal to the one or more identified content delivery networks.

In some implementations, the satellite is a high throughput geostationary satellite.

In some implementations, transmitting the mixed digital media signal to the satellite uplink device using the HTTP protocol comprises streaming the mixed digital media signal using a high definition video streamer.

In some implementations, the system further comprises an audio/video switching or mixing device, and the converting the plurality of media signals into the mixed digital media signal comprises converting the plurality of media signals into the mixed digital media signal using the audio/video switching or mixing device and transmitting the mixed digital media signals to the high definition video streamer through a high definition serial digital interface.

In some implementations, the plurality of media signals is transmitted to the audio/video switching or mixing device using one or more HDMI connections.

In another aspect of the present disclosure, a method for distributing an audio/visual feed of a live event includes obtaining a plurality of media signals for the live event from one or more signal sources, where the plurality of media signals comprises an audio or visual feed of the live event. In the method, the plurality of media signals is converted into a mixed digital media signal. The mixed digital media signal are transmitted, using a network protocol (e.g., an HTTP protocol), to a satellite through a satellite uplink device for distribution to a plurality of client devices. The mixed digital media signal is encoded, either before or after the transmission, using (i) a first video codec at each of a plurality of bitrates and (ii) a first audio codec, into a first plurality of bitrate streams. Each bitrate stream in the first plurality of bitrate streams comprises the video portion of the one or more digital media signals encoded at a corresponding bitrate in the first plurality of bitrates by the first video codec.

In some implementations, the mixed digital media signal is transmitted to the satellite uplink device using a radio frequency connection.

In some implementations, the first video codec is H.264. In other implementations, the first video codec is H.264, and the first audio codec is ACC.

In some implementations, the first plurality of bitrate streams is stored in a video container. In some implementations, the video container is in MPEG-2, MP4, 3GP, or 3G2 format.

In some implementations, the video container is in advanced systems format, the first video codec is a windows media video codec and the first audio codec is a windows media audio codec.

In some implementations, the first plurality of bitrate streams is configured for adaptive bitrate streaming, and the method further includes downloading the first plurality of bitrate streams of the live event and delivering the first plurality of bitrate streams to the plurality of client devices using an adaptive bitrate streaming protocol.

In some implementations, the adaptive bitrate streaming protocol is ADOBE dynamic streaming for FLASH or APPLE HTTP adaptive streaming.

In some implementations, a client device in the plurality of client devices is a tablet computer, a smart phone, a desktop computer, a laptop commuter, a TV, or a portable media player.

In some implementations, a system for distributing an audio or visual feed of a live event is provided. The system comprises an audio processing device for processing one or more signal sources. The audio processing device comprises one or more processors and a memory. The system further comprises a satellite uplink device that receives input from the audio processing device as well as a satellite in electronic communication with the satellite uplink device. The memory comprises one or more programs that are configured to be executed by the one or more processors. The one or more programs include instructions for: (i) obtaining a plurality of media signals for the live event from one or more signal sources, where the plurality of media signals comprises an audio or visual feed of the live event, (ii) converting the plurality of media signals into a mixed digital media signal, and (iii) transmitting, using a network protocol (e.g., an HTTP protocol), the mixed digital media signal to the satellite through the satellite uplink device for distribution to a plurality of client devices. The mixed digital media signal is encoded, either before or after the transmission, using (a) a first video codec at each of a plurality of bitrates and (b) a first audio codec, into a first plurality of bitrate streams, and each bitrate stream in the first plurality of bitrate streams comprises the video portion of the one or more digital media signals encoded at a corresponding bitrate in the first plurality of bitrates by the first video codec.

In some implementations, the mixed digital media signal is transmitted to the satellite uplink device using a radio frequency connection.

In some implementations, the first video codec is H.264.

In some implementations, the first video codec is H.264, and the first audio codec is ACC.

In some implementations, the first plurality of bitrate streams is stored in a video container.

In some implementations, the video container is in MPEG-2, MP4, 3GP, or 3G2 format.

In some implementations, the video container is in advanced systems format, the first video codec is a windows media video codec and the first audio codec is a windows media audio codec.

In some implementations, the first plurality of bitrate streams is configured for adaptive bitrate streaming, and the one or more programs further comprises instructions for downloading the first plurality of bitrate streams of the live event and delivering the first plurality of bitrate streams to the plurality of client devices using an adaptive bitrate streaming protocol.

In some implementations, the adaptive bitrate streaming protocol is ADOBE dynamic streaming for FLASH or APPLE HTTP adaptive streaming.

In some implementations, a client device in the plurality of client devices is a tablet computer, a smart phone, a desktop computer, a laptop commuter, a TV, or a portable media player.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The present disclosure incorporates by reference, in its entirety, U.S. Patent Application Ser. No. 61/725,421, filed on Nov. 12, 2012, entitled "Systems and methods for communicating a live event to users using the Internet."

The implementations described herein provide techniques for distributing audio or video feed of a live even via a satellite. These techniques may significantly increase viewing experience for viewers, and viewership and ratings for content providers (e.g., live performance artists or TV stations).

In some implementations, at a live event (e.g., a rock concert), audio and video data are collected from the event live, using several video cameras, and microphones. In some implementations, the video cameras include camcorders. The audio and video data are then mixed into mixed digital signals and streamed into bitrate streams. In some implementations, the bitrate streams are then transmitted to a geodetic satellite via a mobile VSAT (e.g., mounted on a vehicle). The satellite relays the bitrate streams to teleports located in various geographic locations where viewers may be found. In some implementations, the bitrate streams are then transcoded and delivered to one or more content delivery networks, which further deliver the bitrate streams to client devices, such as tablets, laptops, and smart phones, for user to view or to listen to.

In this way, in situations where (1) neither a cable network connection nor the Internet is available, or (2) performance of an existing cable network connection or Internet connection is inadequate (e.g., with only limited bandwidth or relatively high packet loss)—especially for broadcasting a live event, which may require a high speed connection to avoid delays detectable by a user—content providers would still be able to broadcast an event alive, and thus viewers would also still be able to experience the event as it is happening. This approach is advantageous, because: (i) for viewers, viewing experience is enhanced; and (ii) consequently, for content providers, viewership and profitability are increased.

Additional details of implementations are now described in relation to the figures.

Figure 1:
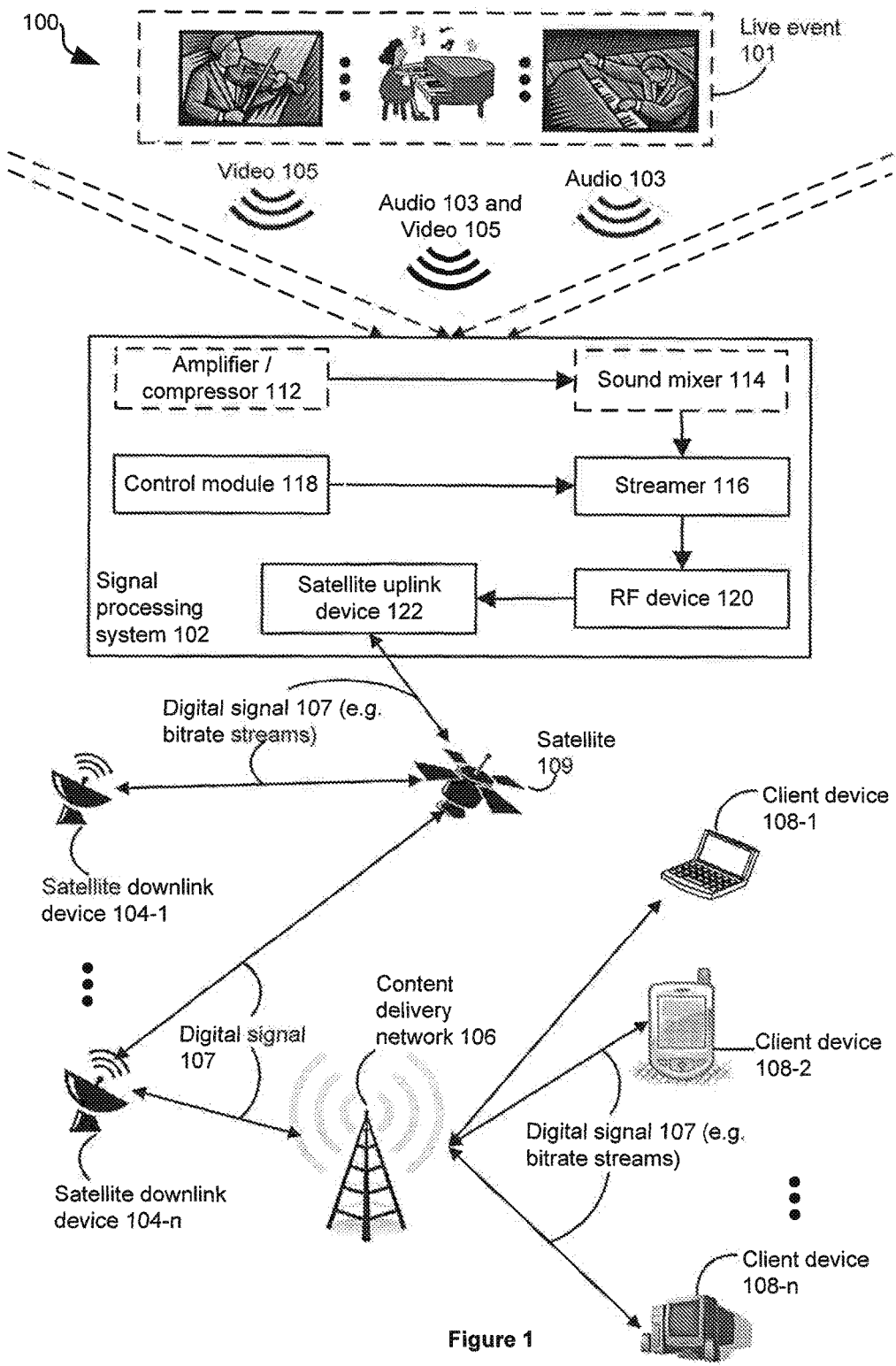
FIG. 1 is a block diagram illustrating a system for distributing audio/video feed of live event via a satellite, in accordance with some implementations.

FIG. 1 is a block diagram illustrating a system 100 for distributing audio/video feed of a live event via a satellite, in accordance with some implementations. In some implementations, the system 100 includes a signal processing system 102, a satellite 109, a satellite downlink device 104, a content delivery network 106, and one or more client devices 108.

In some implementations, a predefined number of microphones, or video cameras (or camcorders) are first positioned and configured to record a live event 101 (e.g., a live concert or a press conference).

In some implementations, as the live event is unfolding, the signal processing system 102 obtains video 105 or audio 103, or a portion thereof, from the live event 101 (e.g., a live concert, a live rave party, or a traffic accident). In some implementations, the video 105 is obtained via a camera or camcorder placed at a predefined position relative to the live event (e.g., at a 30 degree angle to a main artist or a primary musical instrument). In other implementations, the video 105 is obtained via a camera or a camcorder placed at a predefined position relative to an output from a display system in use at the live event 101 (e.g., within 3 feet of a LCD screen that is part of a display system at a rock concert).

In some implementations, the video camera/camcorder is a PANASONIC HPX-250, CANON XH A1, CANON XH G1, PANASONIC AG-HVX200, PANASONIC AG-DVX100B, SONY HDR-FX1, CANON XL2, CANON GL1, SONY HANDYCAM HDR-AX2000, PANASONIC AG-HMC150, PANASONIC AVCCAM AG-AC160, SONY HANDYCAM HDR-FX1000, PANASONIC AVC-CAM AG-AF100, SONY HVR-V1U, CANON XH A1S, SONY HVR-Z7U, CANON EOS C300, SONY HXR-NX5U, CANON XF100, CANON XL HIS, or CANON XF305 camera. In other implementations, the video camera/camcorder is a CANON GOPRO HERO3, a CANON GOPRO HERO2, CANON GOPRO HERO camera. SONY ACTION, LOGITECH WEBCAM C525, LOGITECH WEBCAM C270, LOGITECH WEBCAM C310, or a LOGITECH WEBCAM C110 camera.

In some implementations, the audio 103 is obtained via a microphone placed at a predefined position relative to the live event (e.g., at a 30 degree angle to a main artist or a primary musical instrument). In other implementations, the audio 103 is obtained via a microphone placed at a predefined position relative to an output from a sound system in use at the live event 101 (e.g., within 3 feet of a high-quality bass/treble speaker or a subwoofer that is part of a sound system at a rock concert). In some implementations, the microphone is a NEUMANN U87 Ai/SETZ, TLM-102, TLM 49, TLM 103, KMS 105 MT, TLM-102 ambient microphone, or a phantom-powered condenser microphone. In some implementations, the microphone is a SHURE SM-57, ROYER R-121, MXL 990, or a BLUE MICROPHONES YETI microphone.

In some implementations, the signal processing system 102 includes an amplifier/compressor 112 (optionally), a sound mixer 114 (optionally), a streamer 116, a control module 118, a RF device 120, and a satellite uplink device 122. In some implementations, the signal processing system 102 obtains audio or video (e.g., the audio 103 or video 105) from a live event, as analog signals, processes these signals, and transmits corresponding digital signals (e.g., bitrate streams) to a satellite, at predefined radio frequencies. In some implementations, the signal processing system 102 is mobile or portable—e.g., mounted on a vehicle, or collapsible and transportable in a trunk case—and can therefore provide on-the-go network connection at live events where an Internet connection or a cable network connection, with satisfactory performance or speed, is unavailable.

In some implementations, the optional amplifier/compressor 112 amplifies or compresses (audio or video) signals received from a microphone or a camera. In some implementations, where two or more (e.g., ambient) microphones or cameras are used to collect the audio or video signals, a matching number of amplifiers/compressors are used, with each microphone or camera having a corresponding amplifier/compressor. In some embodiments, the amplifier/compressor 112 concurrently amplifies/compress audio or video signals in accordance with one or more predefined parameters, such as a predefined compression ratio, an attack time, or a release time.

In some implementations, the optional sound mixer 114 mixes (e.g., ambient) audio or video signals received from one or more microphones or cameras monitoring the live event 101, as well as signals from a sound or video board feed associated with the live event. In some implementations, the optional sound mixer 114 then produces a corresponding mixed signal. In other implementations, the sound mixer 114 mixes amplified or compressed (audio or video) signals received from the amplifier/compressor 112 (rather than directly from microphones or cameras), and produces a corresponding mixed signal.

In some implementations, the streamer 116 receives signals from the sound mixer 114, and produces one or more corresponding bitrate streams. In some implementations, the one or more bitrate streams are stored in one or more audio or video containers (e.g., MP4, 3GP, 3G2). In some implementations, where the sound mixer 114 is not in use, the streamer 116 receives signals from microphones or cameras collecting audio or video from the live event, and produces one or more corresponding bitrate streams.

In some implementations, the control module 118 controls or modifies the operation of the streamer 116, e.g., causing different encoders to be applied to signals received by the streamer, or delays to be inserted insert or removed from the bitrate streams. In some implementations, the control module 118 controls the streamer 116 via a wireless connection (e.g., wifi, bluetooth, radio, or infrared). In some implementations, the control module 118, or a portion thereof, is implemented as a software module (e.g., a smart phone or tablet application) or a hardware module (e.g., a remote control device).

In some implementations, the RF device 120 processes the one or more bitrate streams produced by the streamer 116, and transmits the processed streams as radio signals to the satellite uplink device 122. In some implementations, the radio signals are transmitted at one or more predefined frequency bands (ranges), e.g., 1-2 GHz, 2-4 GHz, 4-8 GHz, 8-12.5 GHz, 12.5 to 18 GHz, 18 to 26.5 GHz, and 26.5 to 40 GHz. In some implementations, the satellite uplink device 122 and the RF device 120 are wirelessly connected to each other. In some implementations, the RF device 120 is located on a floor, e.g., an elevate floor, of a building and the satellite uplink device 122 is located on the street near the building, in a parking garage near the building, or in a parking lot, alley, or yard near the building.

In some implementations, the satellite uplink device 122 locates a predefined satellite (e.g., using appropriate authorization credentials), and transmits the radio signals generated by the RF device 120 to the predefined satellite. In some implementations, the satellite uplink device 122 transmits digital signals 107, as opposed to analog signals, to the satellite 109.

In some implementations, the satellite 109 is a satellite owned or rented by the live event organizer. In some implementations, the satellite 109 is selected based on one or more predefined criteria (e.g., processing power, bandwidth, location, rental contract, pricing, or ownership). In some implementations, the satellite 109 is a geodetic satellite.

In some implementations, the satellite 109 relays the received radio signals to one or more satellite downlink devices located in one or more target areas. In other implementations, the satellite 109, acting as an intermediary, relays the received radio signals to one or more other satellites, which then deliver the radio signal to the one or more satellite downlink devices.

In some implementations, the one or more satellite downlink devices (e.g., satellite downlink devices 104-1 . . . 104-n) are determined based on a predefined set of criteria, such as potential viewership, predicted profitability, geographical location, population density in a target area, and processing power or ownership of a satellite downlink device. For example, to maintain a threshold performance level (e.g., to avoid no user-observable or -detectable delay on a client device), the satellite connects to at least 5 downlink devices in a highly-populated area, such as New York City, N.Y., where viewer demand is high. For another example, to maintain the threshold performance level, the satellite connects with high performance satellites but forgoes connections with low performance satellites.

In some implementations, the satellite downlink device 104 processes (e.g., transcodes) the digital signals 107 received from the satellite 109, and transmits the processed (e.g., transcoded) signals to a content delivery network 106. In some implementations, a satellite downlink device includes a teleport. In other implementations, a satellite downlink device includes an XM satellite radio receiver.

In some implementations, the satellite downlink device is stationed at a predefined location. In other implementations, like the signal processing system 102, the satellite downlink device is also mobile (e.g., mounted on a vehicle, such as a recreational vehicle or a pickup truck, or a mobile structure, such as a mobile residence or a transportable trunk case). In other implementations, the satellite downlink device is built into a vehicle's sound system (e.g., part of a stereo sound system) or into a handheld device (e.g., an XM satellite hand-held receiver).

In some implementations, the content delivery network 106 further delivers with high quality (e.g., high definition) the digital signals received from the satellite downlink device 104 to one or more client devices 108. In some implementations, the content delivery network 106 includes a large distributed system of data servers located in multiple data centers on the Internet. In some implementations, the content delivery network 106 is configured to deliver to end-users (e.g., viewers) media content, with high availability and high performance. In some implementations, the owner of the content delivery network 106 and the owner of the satellite 109 share a predefined relationship (e.g., contractual, business, or organizational). In some implementations, the content delivery network 106 is owned by ATT, VERIZON, BELL, AMAZON, AKAMAI TECHNOLOGIES, EDGECAST NETWORKS, LEVEL 3 COMMUNICATIONS, or LIMELIGHT NETWORKS. In some implementations, the content delivery network 106 optionally includes the Internet, one or more local area networks (LANs), one or more wide area networks (WANs), other types of networks, or a combination of such networks.

In some implementations, the one or more client devices 108 include consumer electronics capable of playing media content, such as a smart phone, a tablet, a computer, a laptop, a desktop, a display, a TV, and a connected TV (a GOOGLE TV or an APPLE TV device).

Figure 2:
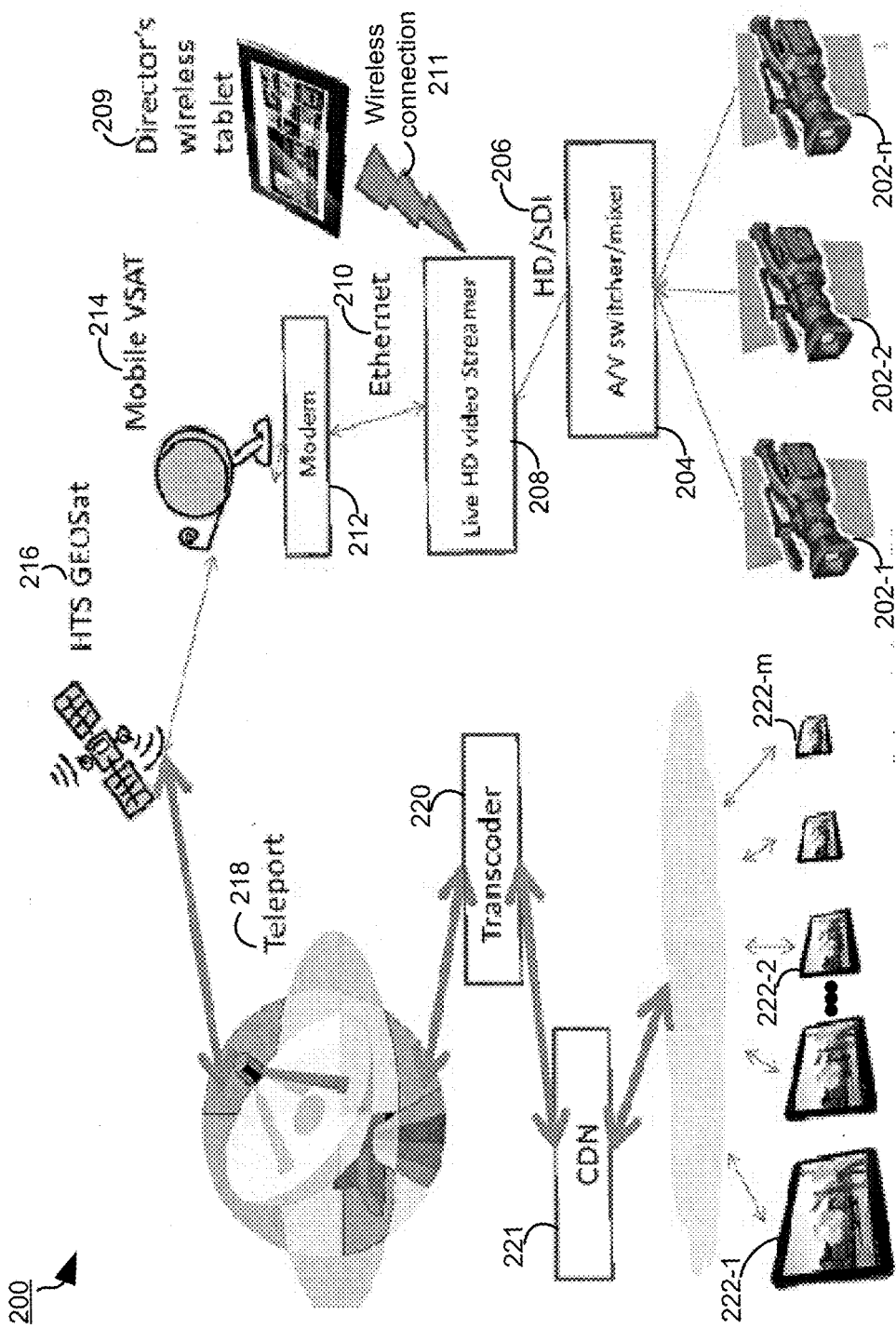
FIG. 2 is a block diagram illustrating an example implementation of a satellite broadcasting system, in accordance with some implementations.

FIG. 2 is a block diagram illustrating an example implementation of a satellite broadcasting system, in accordance with some implementations.

In some implementations, as shown in FIG. 2, audio or video data, from a live event, are collected using one or more (e.g., high definition) camcorders 202-1, 202-2 . . . 202-n (e.g., mobile or stationed at various locations in relation to the live event). In some implementations, the audio or video data are then transmitted to an A/V switcher or mixer 204, using wired (e.g., HDMI cable) or wireless (e.g., wifi) connections so as to increase the mobility of the camcorders during the live event, thereby providing a more comprehensive reporting of the live event.

In some implementations, the A/V switcher or mixer 204 transmits the audio or video data to a live HD video/audio streamer 208, as digital signals, via a high definition serial digital interface ("HD-SDI") connection 206, a HDMI connection, or a cable connection. In some implementations, the A/V switcher or mixer 204 includes the amplifier/compressor 112 or the sound mixer 114 (shown in FIG. 1).

In some implementations, the live HD video/audio streamer 208 produces one or more bitrate streams, using signals received from the A/V switcher or mixer 204, and transmits the bitrate streams to a modem 212, via an Ethernet connection 210. In some implementations, the bitrate streams are produced in accordance with communications (e.g., control signals) received from a control device. In some implementations, the control device is a mobile computing device (e.g., a tablet) equipped with appropriate software packages and processing power. In some implementations, the control device connects with the live HD video/audio streamer 208 via a wireless connection (e.g., so as to increase mobility of the control device, or a user thereof). In some implementations, a person in charge of broadcasting the live event, such as a broadcasting director, controls the control device (and thus the operation of the live HD video/audio streamer 208) for the duration of the event.

In some implementations, the modem 212 further transmits the digital signals to a mobile VSAT 214. In some implementations, the mobile VSAT 212 is mounted on a vehicle (e.g., a broadcasting vehicle). In some implementations, the mobile VSAT is capable of being folded or collapsed into and transported within a trunk case like container (e.g., to increase the mobility of the VSAT). In some implementations, two or more mobile VSATs are used concurrently, to provide a more comprehensive report of the live event. In some implementations, where several mobile VSATs are used concurrently, one mobile VSAT broadcasts one part of a live event at one location, and another mobile VSAT broadcasts another part of the same event at a different location. For example, one mobile VSAT is used to broadcast, on scene, a roadside traffic accident; while another mobile VSAT is used to broadcast, at a nearby hospital, medical condition of injured occupants.

In some implementations, the mobile VSAT 214 locates a satellite 216, such as a high throughput geo-stationary satellite ("HTS GEOSat" or "GEOSat"), establishes a connection with the GEOSat (e.g., using appropriate credentials), and transmits the digital signals to the GEOSat.

In some implementations, the HTS GEOSat 216 further transmits (e.g., relays) the digital signals to one or more teleports 218 (or hand-held satellite signal receivers) located in different geographical areas. In some implementations, the HTS GEOSat 216 is a satellite whose bandwidth (e.g., transmission speed during a particular time period) or a portion thereof is rented from or owned by DISH NETWORK, HUGHES NETWORK, DIRECTTV NETWORK or TELESAT Canada.

In some implementations, the one or more teleports 216 transmit the digital radio signals to a transcoder 220, which performs one or more digital-to-digital transcoding operations (lossy or lossless) before delivering the transcoded digital signals to a content delivery network ("CDN") 221. In some implementations, the transcoding operations are determined based on one or more performance criteria. For example, when transmission speed is of essence, transcoding operations configured to produce a predefined degree of compression are performed; for another example, when media content quality is of essence, only lossless transcoding operations are performed.

In some implementations, the CDN 221 transmits the digital signals to one or more client devices 222-1, 222-2 . . . , and 222-n (e.g., smart phone, tablets, or smart TV devices), where media content corresponding to the live event is displayed to a user in real time or within a threshold amount of delay (e.g., less than 300 milliseconds) from the occurrence of the live event.

Figure 3:
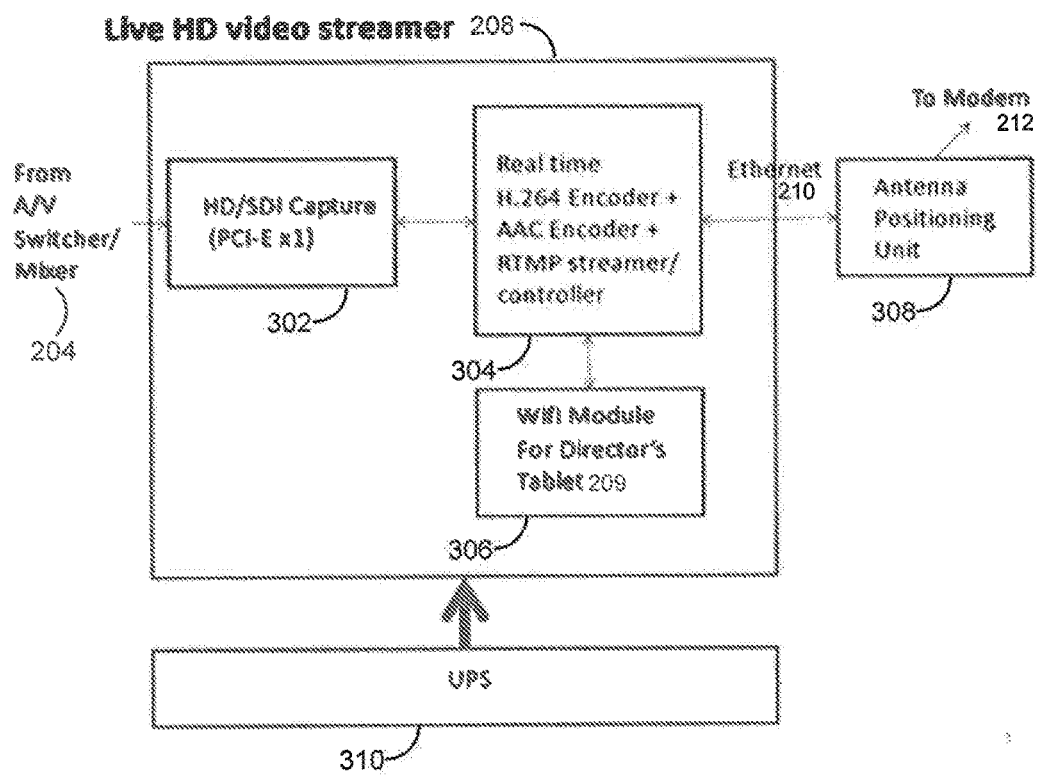
FIG. 3 is a block diagram illustrating an example live HD video streamer, in accordance with some implementations.

FIG. 3 is a block diagram illustrating an example live HD video streamer 208, in accordance with some implementations.

In some implementations, the live HD video stream 208 receives input from the A/V switcher/mixer 204 (as shown in FIG. 1) and a uninterrupted power supply("UPS") 310, and outputs digital signals to the Modem 212 or an antenna position unit connected thereto. In some implementations, digital signals received from the A/V switcher/mixer 204 are first processed by a HD-SDI capture unit 302, which is configured to capture a predefined number of HD-SDI link sources simultaneously and support a variety of predefined formats. In some implementations, the HD-SDI capture unit 302 is a PCI-E x1 compatible device.

In some implementations, output from the HD-SDI capture unit 302 is transmitted to a controller 304, which includes a real time H.264 encoder, AAC encoder or an RTMP streamer.

In some implementations, the controller 304 processes the input from the HD-SDI capture unit 302 in accordance with communications (e.g., user input by an event or broadcasting director) received from the UPS 310 (e.g., via a wifi module 209 resident in the streamer 208 and connected with the controller 304).

In some implementations, the signals processed by the controller 304 are transmitted, via the Ethernet 210, to the antenna position unit 308, and then to the modem 212.

In some implementations, the antenna position unit 308 adjusts positions or directions of a satellite uplink device, or a portion thereof (e.g., a satellite dish), so as to locate and connect with a desired satellite, to which digital signals associated with the live event are then transmitted.

Figure 4:
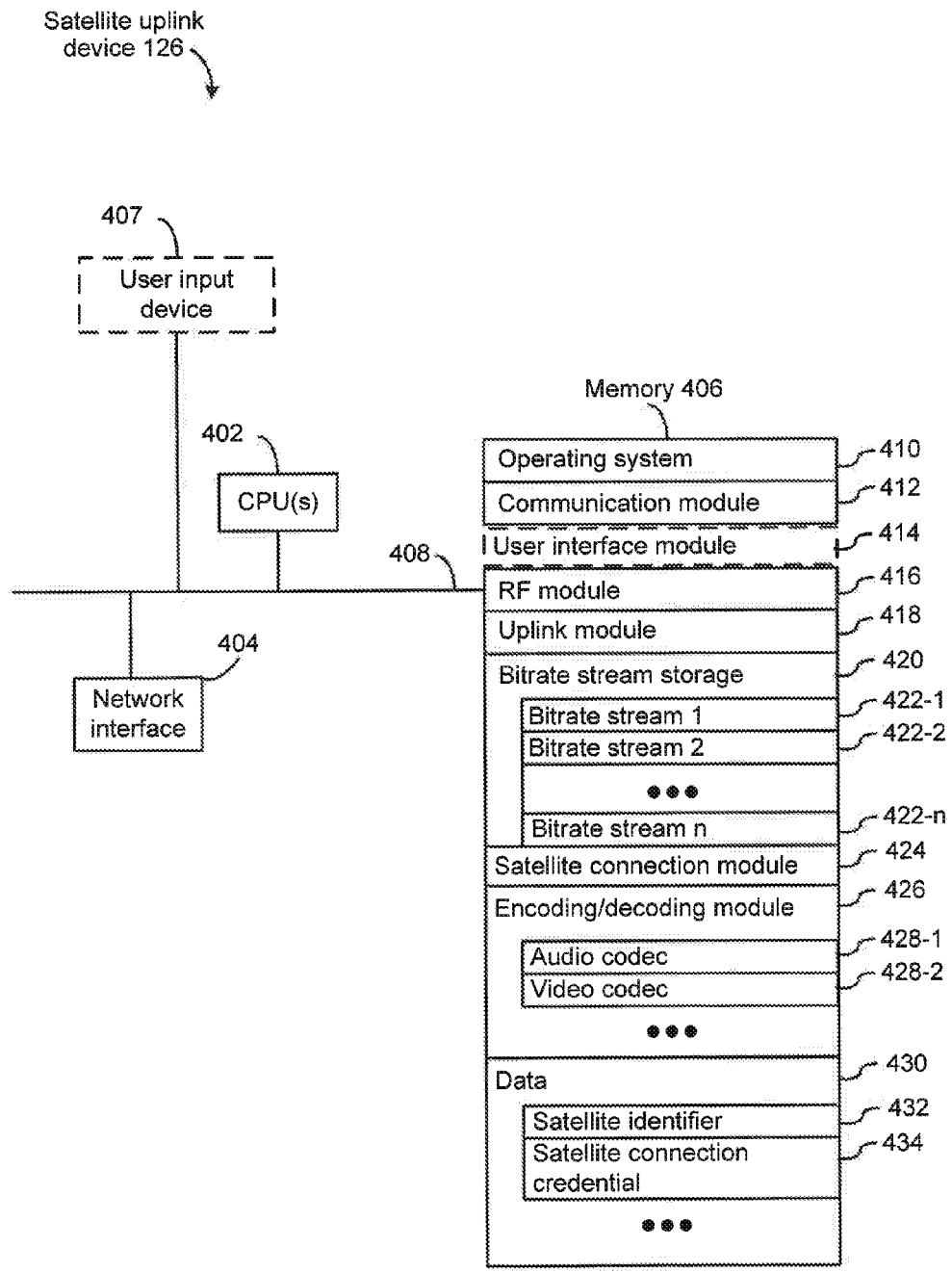
FIG. 4 is a block diagram illustrating a satellite uplink device, in accordance with some implementations.

FIG. 4 is a block diagram illustrating a satellite uplink device, in accordance with some implementations.

The satellite uplink device 126, in some implementations, includes one or more processing units CPU(s) 402 (also herein referred to as processors), one or more network interfaces 404, memory 406, optionally a user input device 407 (e.g., a keyboard, a mouse, a touchpad, or a touchscreen), and one or more communication buses 408 for interconnecting these components. The communication buses 408 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

an operating system 410, which includes procedures for handling various basic system services and for performing hardware dependent tasks;

a network communication module (or instructions) 412 for connecting the satellite uplink device 126 with other devices (e.g., the satellite 109 or the RF device 120) via one or more network interfaces 404 (wired or wireless);

optionally, a user interface module 414 for enabling a user to interact with the satellite uplink device, such as establishing or adjusting a connection between the satellite uplink device and the satellite, e.g., using appropriate login credentials or satellite location information;

optionally, an RF module 416 for converting incoming signals (e.g., from the streamer 116) into radio frequency signals; in some implementations, the RF module 416, or a portion thereof; is implemented in hardware (e.g., a chip set) to provide more processing power or speed;

an uplink module 418 for processing and transmitting RF signals to one or more satellite, in accordance with predefined criteria;

a bitrate stream storage 420, stored on the satellite uplink device 126, which includes:
bitrate stream n 422-$n$ for including digital signals awaiting transmission to the satellite;

a satellite connection module 424 for establishing a new connection or adjusting an existing connection with a satellite (e.g., the satellite 109);

an encoding/decoding module 426 for encoding or decoding RF signals before they are transmitted to a satellite, using one or more audio/video codecs (e.g., 428-1 and 428-2); and data 430, stored on the satellite uplink device 126, which include:
a satellite identifier 432, which uniquely identifies a satellite among several available satellite; and
satellite connection credential 434, e.g., a connection code, or a user name and corresponding password, for establishing or maintaining a connection with one or more satellites.

In some implementations, the satellite uplink device 126 connects concurrently with two or more satellites. In some implementations, transmission load is balanced among the two or more satellites. In some implementations, the same bitrate streams are sent to several satellites with different target area coverage or performance.

Figure 5:
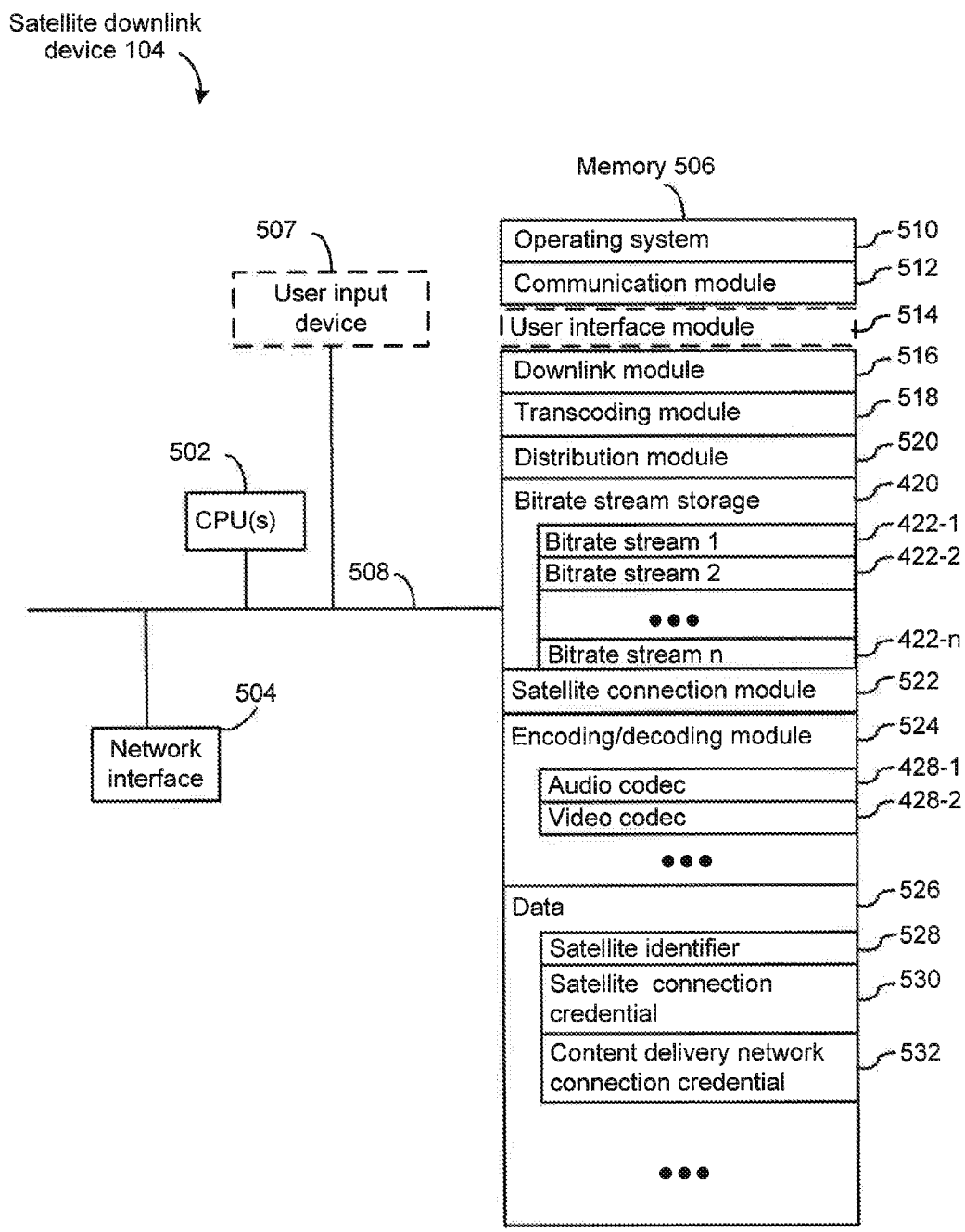
FIG. 5 is a block diagram illustrating a satellite downlink device, in accordance with some implementations.

FIG. 5 is a block diagram illustrating a satellite downlink device, in accordance with some implementations.

The satellite downlink device 104, in some implementations, includes one or more processing units CPU(s) 502 (also herein referred to as processors), one or more network interfaces 504, memory 506, optionally a user input device 507 (e.g., a keyboard, a mouse, a touchpad, or a touchscreen), and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting the satellite downlink device 104 with other devices (e.g., the satellite 109 or the content delivery network 106) via one or more network interfaces 504 (wired or wireless);

optionally, a user interface module 514 for enabling a user to interact with the satellite downlink device, such as establishing or adjusting a connection between the satellite downlink device 126 and the satellite 109, e.g., using appropriate login credentials, satellite location information;

a downlink module 516 for obtaining incoming signals (e.g., bitrate streams) from a satellite, and processing the incoming signals in accordance with predefined processing criteria;

a transcoding module 518, for applying one or more iterations of transcoding to the incoming signals;

a distribution module 520 for distributing the (optionally transcoded) incoming signals to one or more identified content networks;

a bitrate stream storage 420, stored on the satellite downlink device 104, which include:
bitrate stream n 422-$n$ (or processed signals corresponding thereto), for including digital signals received from a satellite (e.g., the satellite 109);

a satellite connection module 522 for establishing a new connection or adjusting an existing connection with a satellite (e.g., the satellite 109);

an encoding/decoding module 524 for encoding or decoding incoming digital signals (e.g., bitrate streams) before they are transmitted to a content delivery network, using one or more audio/video codecs (e.g., 428-1 and 428-2); and data 526, stored on the satellite downlink device 104, which include:
a satellite identifier 528, which uniquely identifies a satellite among several satellite;
satellite connection credential 530, e.g., a connection code, or a user name and corresponding password, for establishing or maintaining a connection with one or more satellites; and
content delivery network connection credential 532, e.g., a connection code, or a user name and corresponding password, for establishing or maintaining a connection with one or more content delivery networks.

Figure 6:
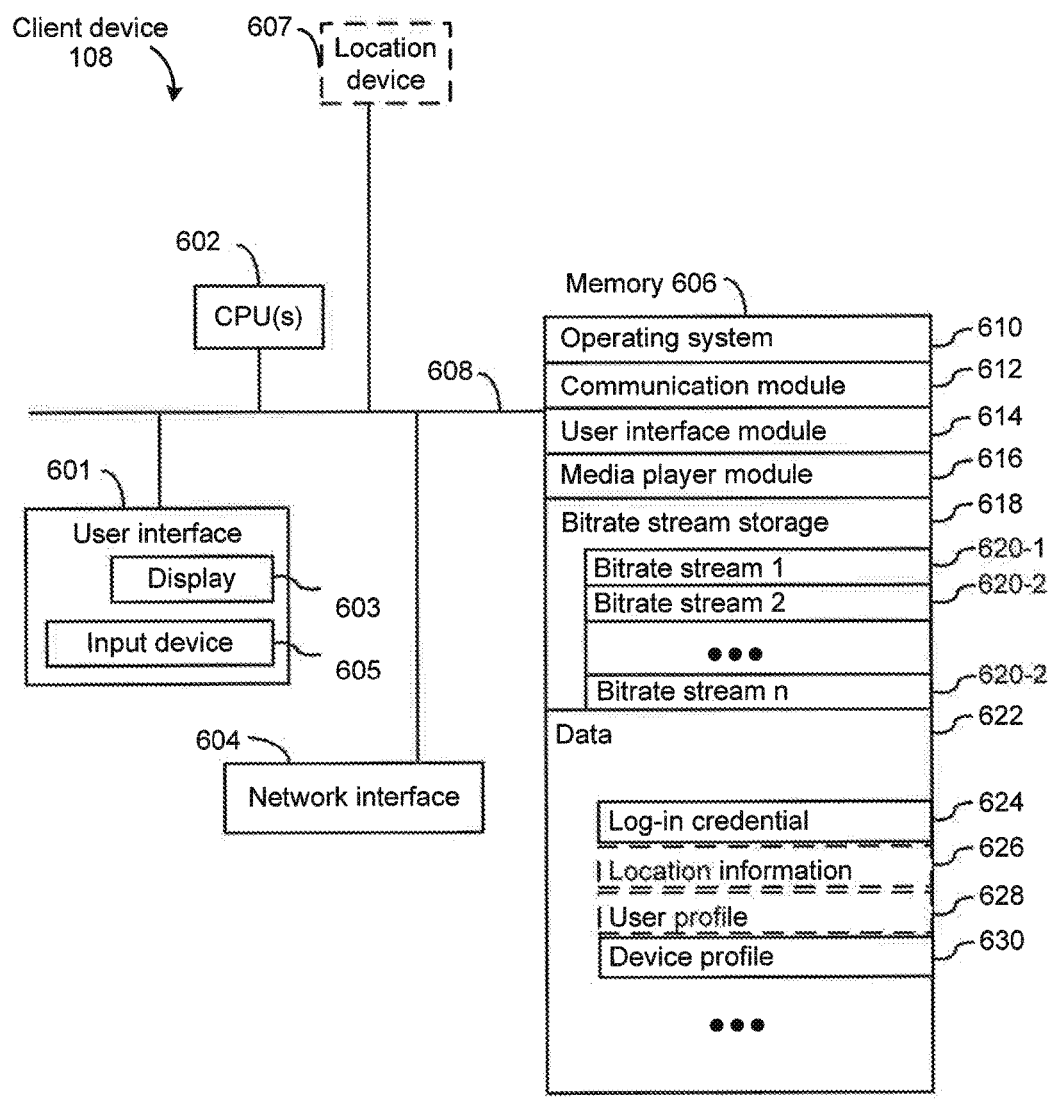
FIG. 6 is a block diagram illustrating a client device, in accordance with some implementations.

FIG. 6 is a block diagram illustrating a client device, in accordance with some implementations.

The client device 108, in some implementations, includes a user interface 601, one or more processing units CPU(s)

602 (also herein referred to as processors), one or more network interfaces 604, memory 606, optionally a location device 607 (e.g., a GPS device), and one or more communication buses 608 for interconnecting these components. The user interface 601 includes a display 603 (e.g., a LCD or a touchscreen), and an input device 605 (e.g., a keyboard, a mouse, a touchpad, or a touchscreen). The communication buses 608 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606, or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

- an operating system 610, which includes procedures for handling various basic system services and for performing hardware dependent tasks;
- a network communication module (or instructions) 612 for connecting the client device 108 with other devices (e.g., the content delivery network 106 or other client devices 102) via one or more network interfaces 604 (wired or wireless);
- a user interface module 614 for enabling a user to interact with the client device (e.g., to receive media content from different content delivery networks, or to display or modify the received media content);
- a media player module 616 (e.g., MICROSOFT media player or APPLE QUICK TIME) for processing media content (or corresponding signals or bitrate streams) received from content delivery network for user consumption (e.g., visually or audibly);
- a bitrate stream storage 618, stored on the client device 108, which includes:
  bitrate stream n 620-n (or processed signals corresponding thereto), for including signals received from the content delivery network; and
- data 622, stored on the client device 108, which include:
  log-in credential 624 for authenticating a user of (e.g., logging into) the client device;
  optionally, location information 626 for indicating location of the client device or a user thereof;
  optionally, a user profile 628 for including, with express user permission, user demographics (e.g., race, profession, income level, or educational level), or user viewing activity, history, or preference; and
  a device profile 630 for including client device configuration information (e.g., display resolutions supported or enabled, graphical or general processing power equipped, operating system version, or memory capacity).

In some implementations, the location device 607 identifies, with a predefined level of accuracy, location of the client device 108, which can be used, in many situations, to infer location of a user of the client device (e.g., the user who has an active login on the client device).

Although FIGS. 4 and 5 show a "satellite downlink device 122" and a "satellite uplink device 104," respectively, FIGS. 4 and 5 are intended more as functional description of the various features which may be present in satellite systems than as a structural schematic of the implementations described herein. In practice, and as recognized by those of ordinary skill in the art, items shown separately could be combined and some items could be separated.

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memories 406, 506, 606 optionally store a subset of the modules and data structures identified above. Furthermore, the memories 406, 506, 606 optionally store additional modules and data structures not described above.

Figure 7:
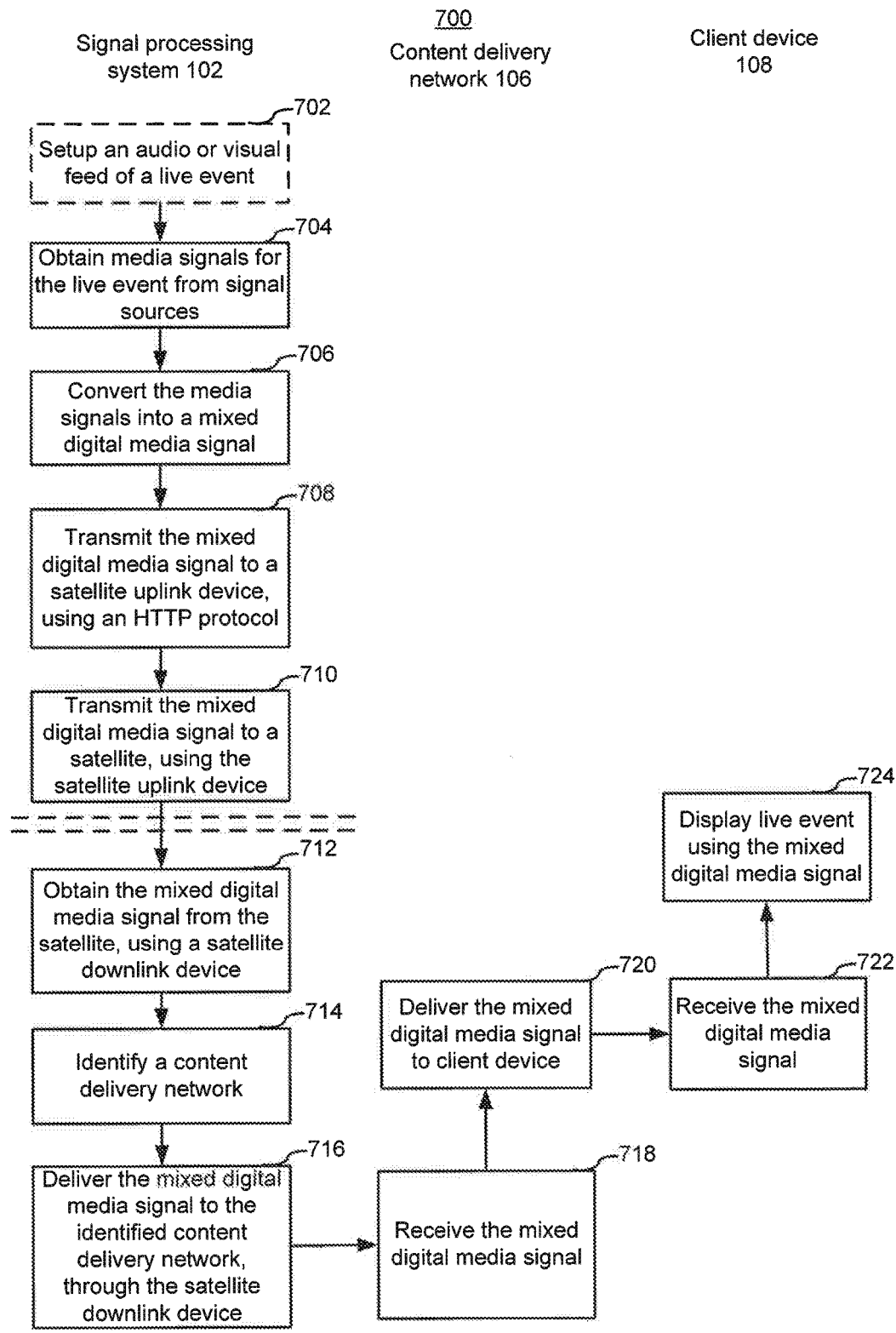
FIG. 7 is a flow chart illustrating a method for distributing audio/video feed of a live event via a satellite, in accordance with some implementations.

FIG. 7 is a flow chart illustrating a method 700, implemented at a computer system, for distributing audio/video feed of live event via satellite, in accordance with some implementations.

In some implementations, an audio or visual feed is optionally first set up at a live event (702), e.g., by positioning one or more microphones or HD cameras at predefined locations relative to the live event. In some implementations, a computer system then obtains (704) media signals for the live event from one or more signal sources (e.g., the microphones or cameras). In some implementations, the media signals are collected as analog signals.

In some implementations, the computer system then converts (706) the (e.g., analog) media signals collected from the signal sources, into a mixed digital media signal, which is then transmitted (708) using a network protocol (e.g., an HTTP protocol) (e.g., through a LAN or an Intranet) to a satellite uplink device. In some implementations, the media signals are mixed using a mixer and then converted, using a streamer (e.g., the streamer 116 in FIG. 1), into one or more bitrate streams.

In some implementations, the mixed digital media signal is transmitted to the satellite uplink device through a wireless connection (e.g., a wifi, Bluetooth, infrared connection). In some implementations, the mixed digital media signal is generated using a device (e.g., the streamer 208) placed in an indoor environment (on a floor, e.g., an elevate floor, of a building, or near a stage), and the satellite uplink device 122 is located on the street near the building, in a parking garage near the building, in a parking lot, alley, or yard near the building, on the roof of a building, a mobile broadcasting vehicle, a large trunk truck, or a trailer truck.

In some implementations, the distance between the streamer 208 and the satellite uplink device is within a predefined threshold distance, so as to maintain signal quality. In some implementations, the distance between the streamer 208 and the satellite uplink device is determined in accordance with capacities associated with the stream or the uplink device. In some implementations, the distance is within 20 meters, 50 meters, 100 meters, 200 meters, or 500 meters.

In some implementations, the wireless connection is implemented in IEEE 802.11 standards, such as 802.11a, 802.11b, 802.11g, 802.11-2007, 802.11n, 802.11n-2012, 802.11ac, and 802.11ad. In some implementations, the wireless connection is implemented in Bluetooth v1.0, v1.0B, v1.1, v1.2, v2.0+EDR, v2.1+EDR, v3.0+HS, or v4.0.

In some implementations, the computer system transmits (710), using one or more satellite uplink devices (e.g., a mobile VSAT), the mixed digital signals at one or more RF frequency bands to a satellite.

In some implementations, the computer system, using one or more satellite downlink devices, such as a teleport or a hand-held satellite signal receiver, obtain s (712) the mixed digital signal from the satellite.

In some implementations, the computer system identifies (714) a content delivery network, among several available content delivery networks, in accordance with one or more predefined criteria. In some implementations, the one or more predefined criteria include one of: performance, bandwidth, quality, pricing, signal coverage, and location.

In some implementations, the computer system delivers (716) the mixed digital media signal (or the bitrate streams) to the identified content delivery network, through the satellite downlink device.

In some implementations, after the mixed digital media signal is delivered, the content delivery network receives (718), and further delivers (720), the mixed media signal, to one or more client devices for user consumption (audibly or visually).

In some implementations, one of the one or more client devices receives (722) the mixed media signal from the content delivery network. In some implementations, media content corresponding to the live event is displayed (720), within a threshold amount of delay (e.g., no more than 75 milliseconds), on the client device. In some implementations, media content is displayed using a predefined resolution (e.g., HD or 1080p), so as to enhance viewing experience.

In some implementations, a user of a client device optionally executes one or more software applications (such as a TIVO like application), so as to capture or save a copy of the media content for later consumption (e.g., a record and play-later feature).

Figure 8A:
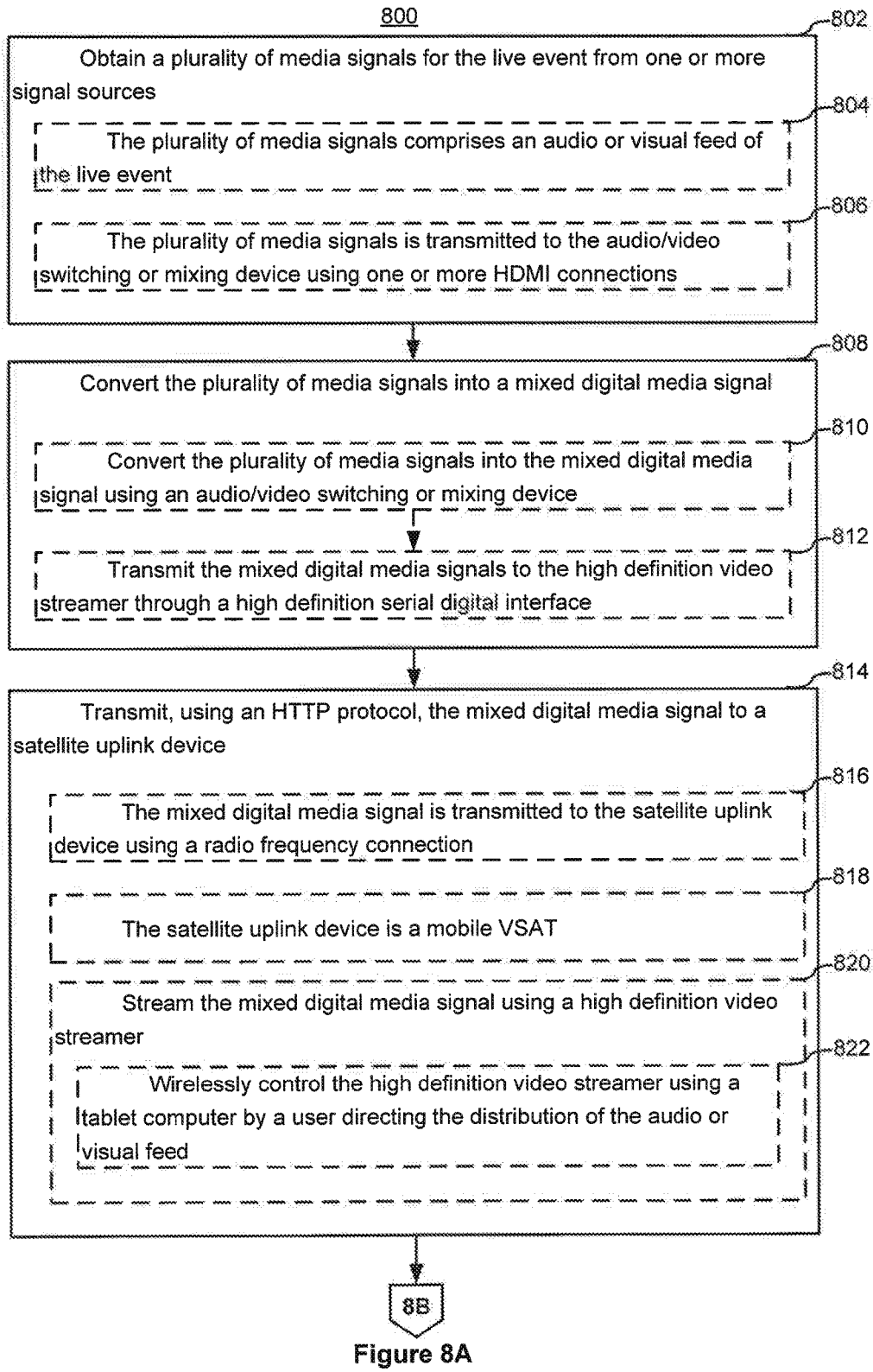
FIGS. 8A-8B are flow charts illustrating methods for distributing audio/video feed of a live event via a satellite, in accordance with some implementations.
Figure 8B:
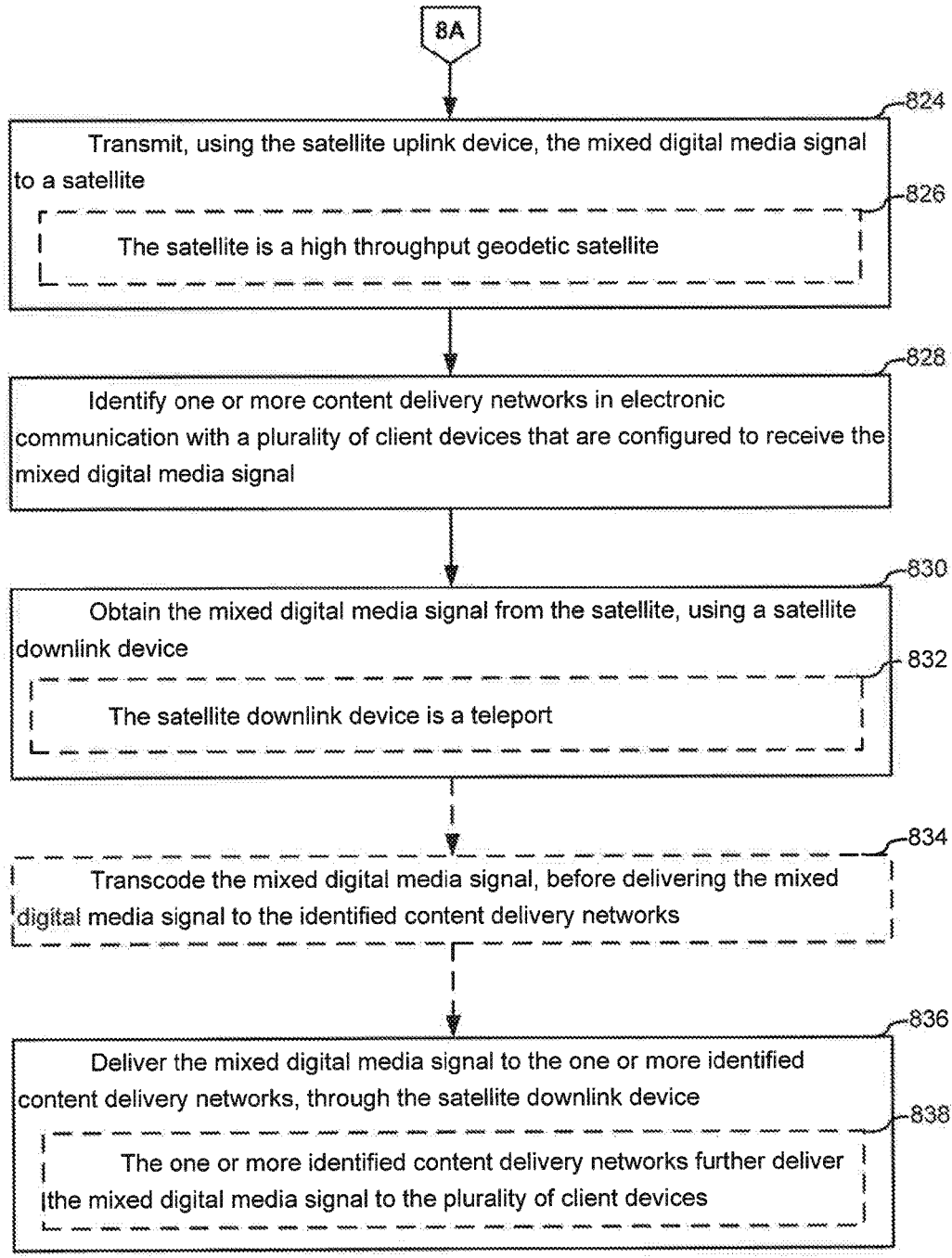

FIGS. 8A-8B are flow charts illustrating a method 800, implemented at a computer system including a satellite uplink device, a satellite, or a satellite downlink device, for distributing audio/video feed of live event via a satellite, in accordance with some implementations.

In some implementations, at a computer system, a plurality of media signals for the live event is obtained (802) from one or more signal sources. In some implementations, a signal source in the one or more signal sources is a HD video camera or a high quality microphone. In some implementations, the plurality of media signals comprises an audio or visual feed of the live event (804). In some implementations, the plurality of media signals includes analog signals collected using microphones, camcorders, or HD cameras, from the live event.

In some implementations, the plurality of media signals is then transmitted to an audio/video switching or mixing device using one or more HDMI connections (806). For example, in some implementations, analog signals collected from microphones or camera are transmitted to the A/V switcher/mixer 104 or the HD video streamer 108 shown in FIG. 2, via one or more HDMI cables, e.g., so as to preserve signal quality.

In some implementations, the plurality of media signals is converted (808) into a mixed digital media signal. In some implementations, the plurality of media signals is first converted (810) into a mixed digital media signal using the sounder mixer 114 or the streamer 116 shown in FIG. 1, or any analog/digital signal conversion device; the mixed digital media signal is, in turn, transmitted (812) to the high definition video streamer (e.g., the live HD video streamer 208 shown in FIG. 2) through a high definition serial digital interface. Converting analog signals to digital signals is advantageous in many situations (e.g., where preserving signal quality is important). Digital signals are less susceptible to noise or interference than analog signals.

In some implementations, the mixed digital media signal is further transmitted (814), using a network protocol (e.g., an HTTP protocol), to a satellite uplink device. In some implementations, the satellite uplink device is mobile, e.g., mounted on a vehicle or a portable structure or container within predefined height, width, or weight measurements. In some implementations, the satellite uplink device is mobile VSAT (818). In some implementations, the satellite uplink device includes a satellite dish for establish a connection with a satellite.

In some implementations, transmitting, using the HTTP protocol, the mixed digital media signal to the satellite uplink device includes streaming the mixed digital media signal using a high definition video streamer (820), e.g., the streamer 116 in FIG. 1. In some implementations, the high definition video streamer is controlled (822), via wired or wireless connections, using a portable computer (e.g., an APPLE IPAD or IPHONE or a GOOGLE NEXUS phone or tablet) by a user (e.g., an event director) directing the distribution of the audio or visual feed. In some implementations, wirelessly controlling the streamer is advantageous: the event director is afforded more mobility while directing a live event, such as a live street performance.

In some implementations, the mixed digital media signal is then transmitted (824), using the satellite uplink device, to a predefined satellite. In some implementations, the satellite is a high throughput geostationary satellite (826), so as to provide high speed connections and thus minimize delays between signal sources at the live event and client devices on which media content are displayed. In some implementations, the mixed digital media signal is transmitted to the satellite using a radio frequency connection (e.g., at predefined frequency) (816).

In some implementations, the mixed digital media signal is obtained (830) from the satellite, using a satellite downlink device. In some implementations, the satellite downlink device is a teleport (832).

In some implementations, the mixed digital media signal is optionally transcoded (834), before being delivered to a content delivery network. In some implementations, the transcoding, a lossy or lossless process, includes a digital-to-digital conversion of signals (e.g., bitrate streams) from encoding format to another (e.g., from MPEG I to MPEG IV). In some implementations, the transcoding includes converting digital signals received from the live event to a format compatible with (i.e., acceptable to) client devices, where media content are displayed to a user. In some implementations, the transcoding process is advantageous, as it allows digital signals to be encoded in a format (e.g., low compression) suitable for transmission by a satellite, and corresponding media content in a different format (e.g., high compression) suitable for delivery to a client device, such as a smart phone, on which storage space is sometimes limited.

In some implementations, one or more content delivery networks in electronic communication with a plurality of client devices are identified (828), where the identified content delivery networks are configured to receive and process the mixed digital media signal.

In some implementations, the mixed digital media signal is then delivered (836) to the one or more identified content delivery networks, through the satellite downlink device.

In some implementations, the one or more identified content delivery networks are configured to deliver (838) the mixed digital media signal to one or more client devices. In some implementations, the content delivery process discussed above is subscription based (e.g., a client device must be an authorized subscriber, in order to receive media content (or the mixed digital media signal) from a content delivery network).

In some implementations, a client device in the plurality of client devices is a tablet computer, a smart phone, a desktop computer, a laptop commuter, a TV, or a portable media player. In some implementations, two client devices in the plurality of client devices are associated with different display resolutions, e.g., a low-resolution cell phone, a medium-resolution tablet computer, and a high-resolution connected TV. In some situations, delivering digital media signals to client devices with different display resolutions is advantageous; as it allows media content to be viewed in a manner best suited a user. For example, a user with high bandwidth (e.g., cable connection) may prefer high-resolution media content; while a user with limited bandwidth (e.g., dial-up connection) may prefer low resolution media content.

Figure 9A:
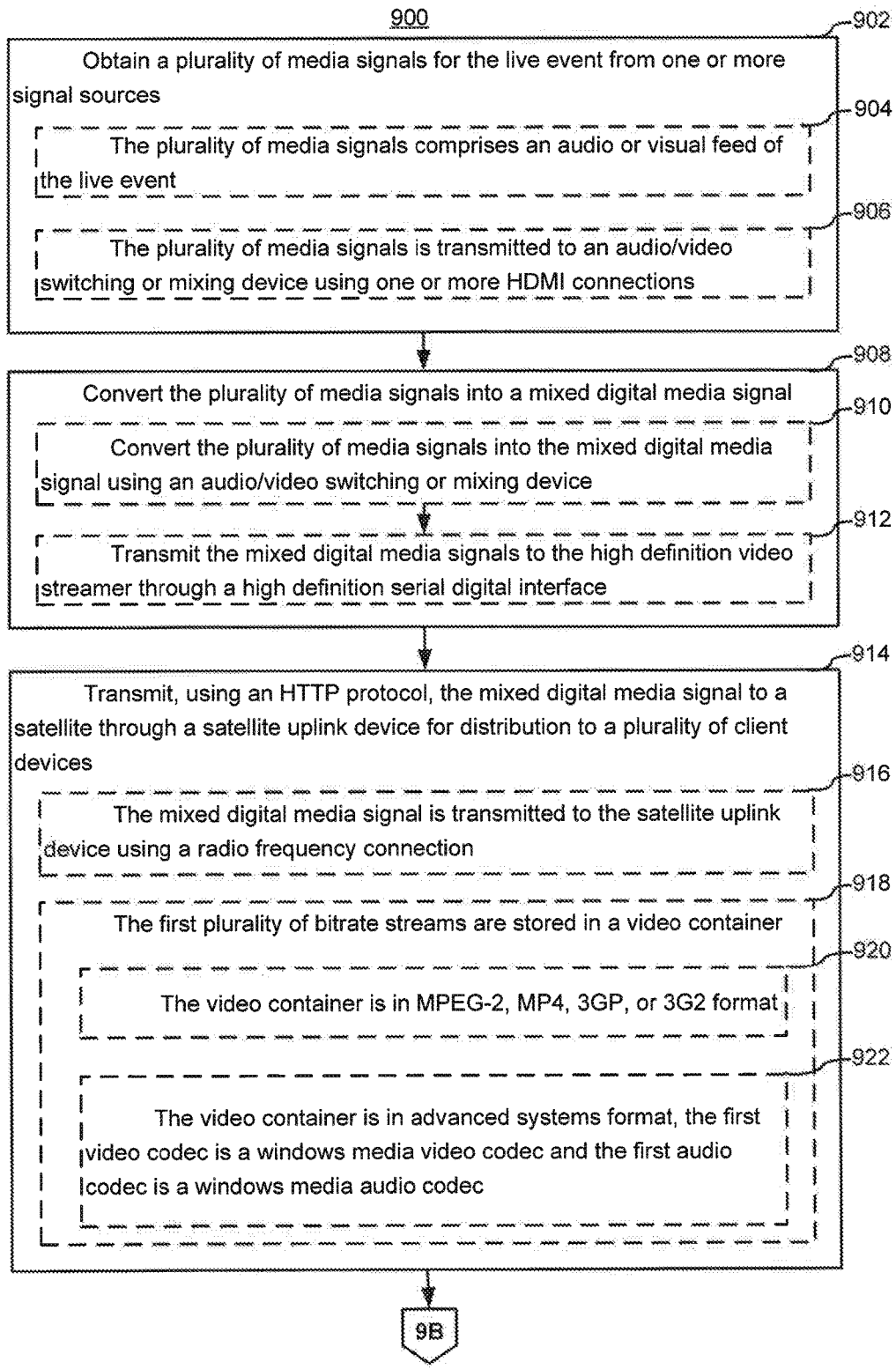
FIGS. 9A-9B are flow charts illustrating methods for distributing audio/video feed of a live event via a satellite, in accordance with some implementations.
Figure 9B:
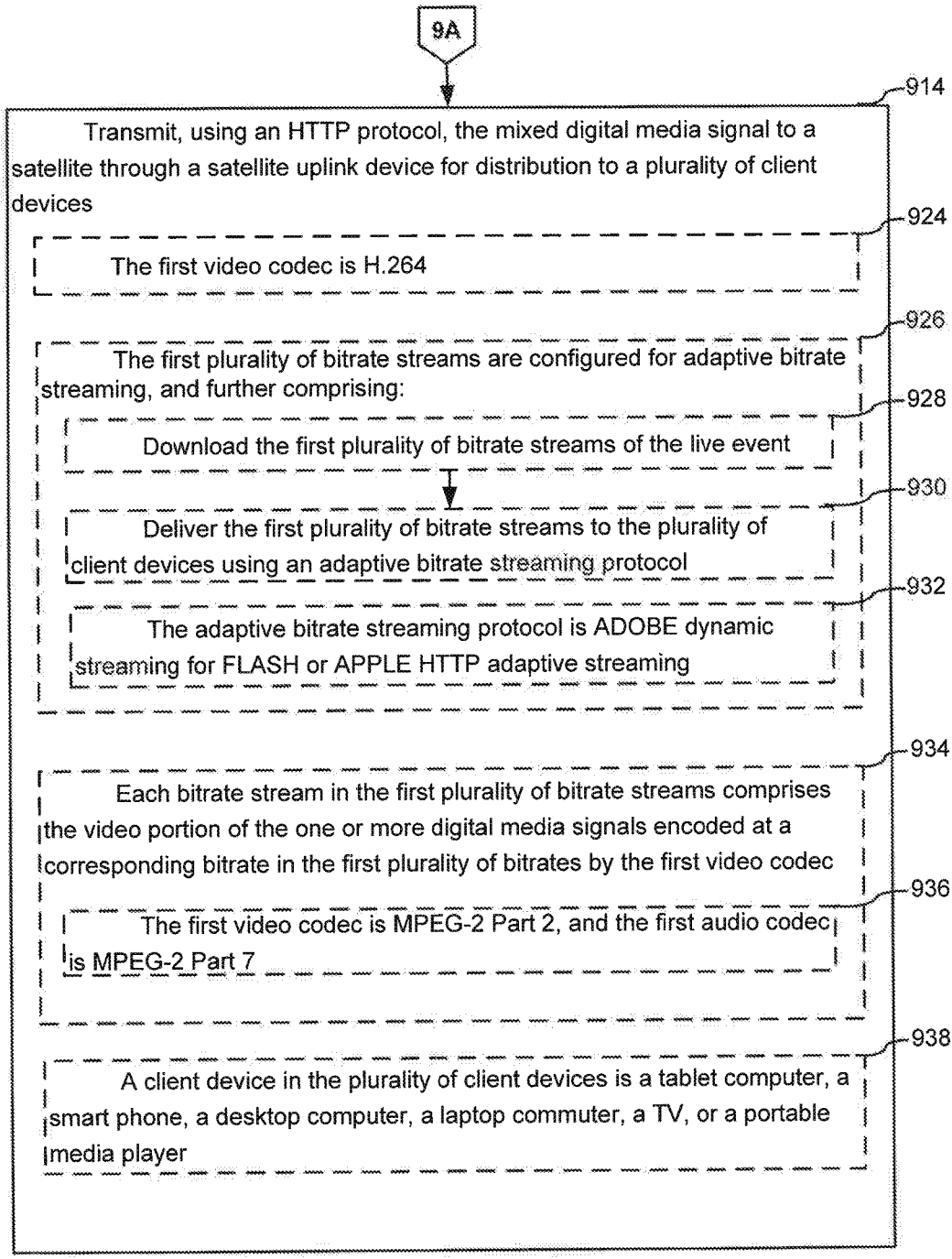

FIGS. 9A-9B are flow charts illustrating a method 900 (e.g., implemented at a computer system) for distributing audio/video feed of a live event via a satellite, in accordance with some implementations.

In some implementations, a plurality of media signals for the live event is obtained (902) from one or more signal sources. In some implementations, the plurality of media signals comprises an audio or visual feed of the live event (904). In some implementations, the one or more signal sources include high quality microphones or HD cameras or camcorders.

In some implementations, the plurality of media signals is transmitted to an audio/video switching or mixing device (e.g., the sound mixer 114 in FIG. 1) using one or more HDMI connections (906), so as to avoid data loss and to preserve signal quality. For example, in some implementations, analog signals collected from high quality microphones or HD camcorders are transmitted to the audio/video switching or mixing device, via one or more HDMI cables.

In some implementations, the plurality of media signals is converted (908) into a mixed digital media signal. In some implementations, the plurality of media signals is first converted (910) into a mixed digital media signal using the sounder mixer 114, or an A/V conversion device; the mixed digital media signals are then transmitted (912) to a high definition video streamer (e.g., the streamer 116 in FIG. 1 or the live HD video streamer 208 in FIG. 2) through a high definition serial digital interface. Converting analog signals to digital signals is advantageous: Digital signals are less susceptible to noise or interference than analogy signals.

In some implementations, the mixed digital media signal outputted by the high definition video streamer is then transmitted (914), using a network protocol (e.g., an HTTP protocol), through a satellite uplink device (e.g., a mobile VSAT), to a satellite for distribution to a plurality of client devices. In some implementations, the mixed digital media signal is transmitted to the satellite uplink device using a radio frequency connection (916).

In some implementations, the mixed digital media signal is encoded, either before or after the transmission, using (i) a first video codec at each of a plurality of bitrates and (ii) a first audio codec, into a first plurality of bitrate streams.

In some implementations, each bitrate stream in the first plurality of bitrate streams comprises the video portion of the one or more digital media signals encoded at a corresponding bitrate in the first plurality of bitrates by the first video codec.

In some implementations, the first plurality of bitrate streams is stored in a video container (918). In some implementations, the video container is in MPEG-2, MP4, 3GP, or 3G2 format (920). In some implementations, the video container is in advanced systems format, the first video codec is a windows media video codec and the first audio codec is a windows media audio codec (922), e.g., so as to enable the video to be displayed in a MICROSOFT media player. In other implementations, the first video codec is H.264 (924).

In some implementations, the first plurality of bitrate streams is configured for adaptive bitrate streaming (926), and the first plurality of bitrate streams of the live event is downloaded (928); and delivered (930) to a plurality of client devices using an adaptive bitrate streaming protocol.

In some implementations, by using adaptive bitrate streaming protocol, quality of the bitrate streams (e.g., video streams) delivered to a client device is determined or adjusted, in accordance with a client device's bandwidth and processing power (e.g., CPU capacity) in real time). In some implementations, an adaptive encoder is used to encode mixed signals at various bit rates, depending on an amount of resources available at real time at a client device. For example, high quality video streams are delivered to a client device equipped with sufficient processing power and a broadband connection, to take advantage of the amble processing and connection capacity; however, lower quality video streams may be delivered to the same client device, when more than half of the client device's processing and connection capacity is used by other applications or opening threads. In some implementations, the use of adaptive bitrate stream protocol is advantageous, because it may reduce buffering and wait time associated therewith, and maintain quality viewing experience for both high-end and low-end connections. In some implementations, the adaptive bitrate streaming protocol is ADOBE dynamic streaming for FLASH or APPLE HTTP adaptive streaming (932).

In some implementations, each bitrate stream in the first plurality of bitrate streams comprises the video portion of the one or more digital media signals encoded at a corresponding bitrate in the first plurality of bitrates by the first video codec (934). In some implementations, the first video codec is H.264, and the first audio codec is ACC (938).

In some implementations, a client device in the plurality of client devices is a tablet computer, a smart phone, a desktop computer, a laptop commuter, a TV, or a portable media player (940).

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components.

These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first codec could be termed a second codec, and, similarly, a second codec could be termed a first codec, which changing the meaning of the description, so long as all occurrences of the "first codec" are renamed consistently and all occurrences of the "second codec" are renamed consistently. The first codec and the second codec are both codecs, but they are not the same codec.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for distributing an audio and visual feed of a live event, the method comprising:
    obtaining a plurality of media signals for the live event from a plurality of signal sources, wherein a first signal source in the plurality of signal sources is an audio feed of the live event and a second signal source in the plurality of signal sources is a video feed of the live event;
    converting the plurality of media signals into a mixed digital media signal, wherein the mixed digital media signal comprises both an audio and visual feed of the live event, and wherein the mixed digital media signal is encoded into a plurality of bitrate streams, wherein each bitrate stream in the plurality of bitrate streams is encoded by (i) a first video codec at a different bitrate in a plurality of bitrates and (ii) a first audio codec;
    transmitting, using a network protocol, the mixed digital media signal, including the plurality of bitrate streams, to a mobile satellite uplink device at the live event, wherein the transmitting to the mobile satellite uplink device transmits the mixed digital media signal less than 500 meters;
    selecting a satellite from a plurality of satellites based on one or more predefined criteria;
    transmitting, using the satellite uplink device, the mixed digital media signal to the selected satellite;
    identifying one or more content delivery networks among available content delivery networks in electronic communication with a plurality of client devices that receive mixed digital media signals, wherein at least one client device in the plurality of client devices is located at a different site than the one or more identified content delivery networks, and wherein the identifying of the one or more content delivery networks is in accordance with one or more predefined criteria which include performance, bandwidth, quality, or pricing;
    obtaining the mixed digital media signal from the selected satellite, using a satellite downlink device; and
    delivering the mixed digital media signal to the one or more identified content delivery networks, through the satellite downlink device, wherein the one or more identified content delivery networks further deliver the mixed digital media signal to the plurality of client devices.

2. The method of claim 1, wherein the mixed digital media signal is transmitted to the satellite uplink device using a radio frequency connection.

3. The method of claim 1, wherein a client device in the plurality of client devices is a tablet computer, a smart phone, a desktop computer, a laptop computer, a TV, or a portable media player.

4. The method of claim 1, wherein a first client device in the plurality of client devices is associated with different display resolution than a second client device in the plurality of client devices.

5. The method of claim 1, wherein a signal source in the plurality of is a video camera or a microphone.

6. The method of claim 1, wherein the satellite uplink device is a mobile VSAT, and the satellite downlink device is a teleport.

7. The method of claim 1, further comprising:
    transcoding the mixed digital media signal, before delivering the mixed digital media signal to the identified content delivery networks.

8. The method of claim 1, wherein the selected satellite is a high throughput geostationary satellite.

9. The method of claim 1, wherein the transmitting the mixed digital media signal to the satellite uplink device using the network protocol comprises:
   streaming the mixed digital media signal using a high definition video streamer.

10. The method of claim 9, further comprising:
   wirelessly controlling the high definition video streamer using a tablet computer by a user directing the distribution of the audio or visual feed.

11. The method of claim 9, wherein the converting the plurality of media signals into the mixed digital media signal comprises:
   converting the plurality of media signals into the mixed digital media signal using an audio/video switching or mixing device; and
   transmitting the mixed digital media signals to the high definition video streamer through a high definition serial digital interface.

12. The method of claim 9, wherein the plurality of media signals is transmitted to the audio/video switching or mixing device using one or more HDMI connections.

13. A system for distributing an audio and visual feed of a live event, comprising:
   an audio processing device for processing a plurality of signal sources, the audio processing device comprising one or more processors and a memory;
   a satellite uplink device that receives input from the audio processing device;
   a plurality of satellites in electronic communication with the satellite uplink device; and
   a satellite downlink device in electronic communication with the plurality of satellites; wherein
   the memory comprises one or more programs that are configured to be executed by the one or more processors, the one or more programs including instructions for:
      (i) obtaining a plurality of media signals for the live event from the plurality of signal sources, wherein a first signal source in the plurality of signal sources is an audio feed of the live event and a second signal source in the plurality of signal sources is a video feed of the live event;
      (ii) converting the plurality of media signals into a mixed digital media signal, wherein the mixed digital media signal comprises both an audio and visual feed of the live event, and wherein the mixed digital media signal is encoded into a plurality of bitrate streams, wherein each bitrate stream in the plurality of bitrate streams is encoded by (i) a first video codec at a different bitrate in a plurality of bitrates and (ii) a first audio codec;
      (iii) transmitting, using a network protocol, the mixed digital media signal, including the plurality of bitrate streams, to the satellite uplink device at the live event, wherein the transmitting to the mobile satellite uplink device transmits the mixed digital media signal less than 500 meters; and
      (iv) identifying one or more content delivery networks among available content delivery networks in electronic communication with a plurality of client devices that receive mixed digital media signals, wherein at least one client device in the plurality of client devices is located at a different site than the one or more identified content delivery networks, and wherein the identifying of the one or more content delivery networks is in accordance with one or more predefined criteria which include performance, bandwidth, quality, or pricing; and wherein
   the satellite uplink device is configured for
      selecting a satellite from the plurality of satellites based on one or more predefined criteria, and
      uploading the mixed digital media signal to the selected satellite; and
   the satellite downlink device is configured for
      obtaining the mixed digital media signal from the selected satellite, and
      delivering the mixed digital media signal to the one or more identified content delivery networks, wherein the one or more identified content delivery networks further deliver the mixed digital media signal to the plurality of client devices.

14. The system of claim 13, wherein the mixed digital media signal is transmitted by the satellite uplink device to the selected satellite using a radio frequency connection.

15. The system of claim 13, wherein a client device in the plurality of client devices is a tablet computer, a smart phone, a desktop computer, a laptop computer, a TV, or a portable media player.

16. The system of claim 13, wherein a first client device in the plurality of client devices is associated with a different display resolution than a second client device in the plurality of client devices.

17. The system of claim 13, wherein a signal source in the plurality of sources is a video camera or a microphone.

18. The system of claim 13, wherein the satellite uplink device is a mobile VSAT and the satellite downlink device is a teleport.

19. The system of claim 13, wherein the satellite downlink device is further configured to transcode the mixed digital media signal before delivering the mixed digital media signal to the one or more identified content delivery networks.

20. The system of claim 13, wherein the selected satellite is a high throughput geostationary satellite.

21. The system of claim 13, wherein the transmitting the mixed digital media signal to the satellite uplink device using the network protocol comprises streaming the mixed digital media signal using a high definition video streamer.

22. The system of claim 21, the system further comprising an audio/video switching or mixing device, and wherein the converting the plurality of media signals into the mixed digital media signal comprises:
   converting the plurality of media signals into the mixed digital media signal using the audio/video switching or mixing device; and
   transmitting the mixed digital media signals to the high definition video streamer through a high definition serial digital interface.

23. The system of claim 22, wherein the plurality of media signals is transmitted to the audio/video switching or mixing device using one or more HDMI connections.

* * * * *